United States Patent Office 3,291,764
Patented Dec. 13, 1966

3,291,764
PREPOLYMERS FROM A POLYAMINO COMPOUND AND AN EPOXIDIZED FATTY ACID ESTER
Thomas W. Findley, La Grange, Ill., assignor to Swift & Company, Chicago, Ill., a corporation of Illinois
No Drawing. Continuation of application Ser. No. 19,147, Apr. 1, 1960. This application July 30, 1965, Ser. No. 476,167
9 Claims. (Cl. 260—18)

This invention relates to a method for the production of valuable new prepolymers and to the preparation of prepolymers of high oxirane content fatty oils and polyamines.

This application is a continuation of my copending application Serial Number 19,147, filed April 1, 1960, now abandoned.

Epoxidized fatty materials, such as epoxidized soybean oil, epoxidized linseed oil, epoxidized rapeseed oil, epoxidized safflower oil, etc., are becoming of increasing importance in the production of polymeric products. These epoxidized fats may be prepared by adding oxirane oxygen across unsaturated bonds of naturally occurring unsaturated fats. A very suitable method for epoxidation involves the percarboxylic acid epoxidation method. This reaction is carried out by reacting any of the peracids such as peracetic acid, performic acid, perphthalic acid, etc., with unsaturated fatty materials to add oxirane oxygen across those points of unsaturation in the molecule. Epoxidation procedures of this type involving both preformed peracids and peracid formation in situ are well known in the art.

It is an object of this invention to provide a polymeric resin from polyamine compounds and high oxirane fatty materials.

It is a further object of this invention to provide a method for preparing prepolymers from oxirane-containing fatty materials.

Another object of the invention is the provision of valuable new prepolymers prepared from polyamine compounds and high oxirane content fatty esters.

Still another object of the invention is to prepare prepolymers which can be dissolved and processed followed by final resinification in place with heat.

Additional objects if not specifically set forth herein will be readily apparent to those skilled in the art from the following detailed description of the invention.

In accordance with the method of this invention, a high oxirane fatty composition and a polyamino composition or mixture of polyamines are mixed and heated to a temperature in the range 25–120° C. until at least one of the reactive groups in each fatty molecule is reacted with an amine group. The reaction probably involves opening of the oxirane ring to form amino alcohol and also some amidation through reaction of the polyamine with the ester group. The two reactions are apparently competitive to some extent, with formation of the amide being favored by lower reaction temperatures and formation of the amino alcohol being favored by reaction at higher temperature. The extent of the combination of epoxy groups with amine groups and ester groups is determined by solubility of the reaction mixture in a weak acid solution.

Although prepolymer formation starts at around room temperature, it has been found convenient to run the reaction at around 80–100° C. on the steam bath or under conditions where local overheating may be avoided. At the higher end of the temperature range, care must be exercised in order to avoid permitting the reaction to proceed through the prepolymer stage to the production of cross-linked polymers. It may be necessary in such cases to quickly cool the reaction mixture by placing the reaction vessel in an ice or cold water bath. The course of the reaction can be judged in a general way by the increase in viscosity of the reaction product, or, alternatively, by withdrawing a small sample from the reaction mixture from time to time and testing for solubility of the reaction product in a very weak 1% aqueous acid solution. If desired, the reaction can also be run under sub- or super-atmospheric pressures and suitable catalysts can be used, such as sodium methoxide.

The polyamine reactant may be selected from any of the various polyamines having at least two nitrogen atoms, and at least one carbon between nitrogens. These compositions include linear polyamines such as alkylene polyamines of 2–10 carbons; arylamines such as benzenoid polyamines; saturated heterocyclic diamino hydrocarbons such as piperazine; amidines such as guanidine; alkylenoxy polyamines and alicyclic hydrocarbon diamines such as menthane diamine. Preferred polyamines are the alkylene polyamines of 2–10 carbons and piperazine and substituted piperazines.

Primary and secondary aliphatic diamines, triamines, tetramines, pentamines and hexamines are desirable amine reactants. Suitable alkylene polyamines which may be employed are: ethylene diamine, 1,2-diamino propane, 1,3-diamino propane, butylene diamine, diethylene triamine, dipropylene triamine, triethylene tetramine, tetraethylene pentamine, pentamethylene diamine, 1,6-hexamethylene diamine, 3,3'-imino bis propylamine, 3-methylamino propylamine, 3-isopropylamino propylamine, 3,3'-methylimino bis propylamine.

Water soluble alkylolamines which can be employed include N-aminoethyl ethanolamine and glycol amines having two or more amino groups and at least two replaceable amino hydrogens. Those alkylolamines having 2–10 carbons are most desirable and include N-aminoethyl ethanolamine [N-(2-hydroxypropyl) ethylene diamine] and ethylene bis-oxypropyl amine, for example.

Equally applicable in the practice of the invention are the alkyl or aryl substituted derivatives of the above whether said substitution takes place on the carbon or nitrogen atoms. Thus the polyamino compound must have at least two primary, two secondary or one primary and one secondary amino group within its molecule which two amino functions must be separated by at least one carbon atom. In any suitable polyamine at least two amino nitrogens must have one or more available hydrogen atoms. Generally, but not specifically related to the compositions set forth above, are many other polyamino compounds, all of which produce prepolymers when reacted with high oxirane fatty materials described herein. These polyamino compounds include saturated cyclic polyamines such as piperazine substituted piperazines such as N-aminoethyl piperazine, and diamino menthane.

Benzenoid amines which can be reacted with the fatty epoxide to form prepolymers having excellent properties include ortho, meta and para phenylene diamine, ortho tolidine and other nuclear substituted aryl amines. The guanidines and substituted guanidines having the required number of available amino hydrogens may also serve as the polyamine component in the reaction. Diphenyl guanidine is an example of a satisfactory substituted guanidine while phenyl biguanide and ortho tolyl biguanide are representative of compositions containing two guanidine radicals.

In the case of the foregoing polyamines, the polyamine is soluble in the epoxidized ester component of the reaction and suitable contact between reactants is assured.

The epoxy reactant may be characterized as a high oxirane content fatty acid ester of a lower polyhydric alcohol. The polyepoxide is a liquid nonpolymeric epoxidized fatty material having nonterminal epoxy groups. Epoxidized linseed oil prepared by epoxidizing refined linseed oil having an Iodine Value of above about 180 with 90% conversion of the double bonds results in the production of an epoxidized glyceride having an oxirane content of about 9.2. A very satisfactory epoxidation technique suitable for the production of low viscosity, high oxirane oils having a minimum of hydroxyl containing by-products is disclosed in copending application Serial No. 807,985 filed April 22, 1959, now abandoned. The epoxy content of fatty esters suitable in preparing the prepolymers is preferably above 8.0 in order to produce prepolymers which eventually cure to hard resins. However, epoxidized oils such as epoxidized soybean oil and epoxidized rapeseed oil which ordinarily have an epoxy content in the range 6–7, and yield a much softer resin as a final product can be used. Naturally occurring fatty oils which yield epoxidized fatty esters having a high oxirane content include, in addition to linseed oils, epoxidized derivatives of other fatty materials having a similar amount of nonconjugated unsaturation. Examples are epoxidized perilla, menhaden, seal, sardine and herring oils.

Similarly, any esters prepared from high oxirane fatty acid esters such as epoxidized linseed fatty esters, epoxidized soybean fatty esters, etc., with lower aliphatic glycols, triols, tetritols, pentitols, etc., may also be used provided the new ester contains a high oxirane content.

In the preparation of the prepolymers, the reactants are admixed in a ratio of about 20–50 parts by weight of amine to 100 parts of the epoxidized fatty acid ester. As greater amounts of polyamine are employed in the reaction, the reaction mechanism is altered until at equal parts polyamine and epoxidized fatty ester, linear polymers are formed. The preferred ratio of polyamine to epoxide is about 30–40 parts polyamine for each 100 parts epoxide.

The following examples are intended to facilitate a more complete understanding of the invention and are not to be construed as limitative.

EXAMPLE I

A mixture of 100 parts epoxidized linseed oil (oxirane content 9.0%; Iodine Value 4.0) and 30 parts tetraethylene pentamine was vigorously agitated and heated to about 80° C. for approximately four hours. The heating time necessary for forming the prepolymer while insuring that complete polymerization did not take place was determined by the solubility of the reaction mixture in a dilute 1% acetic acid solution. A drop of the reaction mixture was removed at intervals and when the drop was soluble in the dilute acetic acid solution the reaction was terminated and the reaction product was cooled. The product was soluble in the dilute aqueous acid and when deposited on a glass surface and heated with removal of water it formed a hard film.

EXAMPLE II

One hundred parts of epoxidized linseed oil (oxirane content 9.0%; Iodine Value 4.0) and 30 parts of triethylene tetramine were heated with continuous mechanical agitation to 75° C. for approximately 5 hours at which time a small sample was found to be soluble in a 1% aqueous solution of acetic acid. At this point, the reaction product was cooled as rapidly as practicable and was ready for subsequent use as a prepolymer coating. Thin films of this prepolymer when heated to 150° C. resinify to a hard tough film in about 4 to 6 hours.

EXAMPLE III

One hundred parts of epoxidized soybean oil (Iodine Value 5.0) containing 6.5% oxirane oxygen, and 35 parts of 3,3' imino bis propylamine $$HN(CH_2-CH_2-CH_2-NH_2)_2$$

were heated with vigorous agitation at 90° C. for about 2½ hours until a drop of the reaction product was soluble in 1% acetic acid. At that point the product was cooled with continuous agitation and formed an orange, soft, semifluid prepolymer.

EXAMPLE IV

One hundred parts of epoxidized sardine oil (Iodine Value 10.1) containing 7.6% oxirane oxygen was mixed with 40 parts of hexamethylene diamine and heated with agitation to 75° C. for about 7 hours after which solubility of the product in 1% acetic solution was observed. The product was cooled by quenching with cold water containing sufficient acetic acid to yield a clear solution containing approximately 35% of the reaction product. The concentration of prepolymer in solution can be varied over a very wide range since viscosity considerations and requirements with respect to the amount to be deposited can be controlled by those skilled in the art.

EXAMPLE V

One hundred parts of epoxidized butyl esters of linseed oil (7.8% oxirane; Iodine Value 3.0) was mixed with 50 parts of tetraethylene pentamine at 90° C. for 2½ hours until a drop of the reaction product was soluble in 1% acetic acid. At this point the product was cooled with continuous agitation to form an orange, soft, semifluid polymer.

Additional prepolymers prepared in accordance with the method of Example I using various epoxidized glycerides and polyamines were produced as follows. In all cases, 30–40 parts of the polyamine were reached with 100 parts of the oil.

| Epoxidized Oil | Percent Oxirane | Iodine Value | Diamino Compound | Reaction Temperature, °C. | Time, hrs. |
|---|---|---|---|---|---|
| Menhaden | 8.2 | 12.1 | Piperazine | 87 | 4 |
| Linseed | 9.7 | 2.0 | p-Phenylene diamine | 80 | 5 |
| Soy | 6.4 | 6.2 | Menthane diamine | 95 | 6 |
| Hempseed | 7.8 | 6.0 | Sym.-diphenylguanidine | 75 | 8 |
| Linseed | 9.2 | 3.2 | Thiourea | 85 | 5 |
| Do | 9.2 | 3.2 | Phenylbiguanide | 85 | 5 |
| Do | 9.2 | 3.2 | N-aminoethanolamine | 80 | 6 |
| Do | 9.2 | 3.2 | Ortho tolidine | 90 | 4 |

The prepolymers described in the examples above vary a great deal in color, viscosity, etc., depending upon the reactants and the severity of reaction conditions. As a general rule the color of the prepolymer darkens with increase in oxirane value of the oxirane reactant. For example, prepolymers from a given diamino compound and epoxidized soybean oil are usually much lighter in color than those obtained from epoxidized marine oils. The same applies to the softness of the final resin.

An outstanding property of these prepolymers is their solubility in dilute aqueous solutions of water miscible acids. While any of the available inorganic mineral acids are suitable in 1% concentration in water to insure solubility of the prepolymer, the very strong acids such as nitric acid and sulfuric acid are not ordinarily employed since they cause some opening of the oxirane ring. The water-soluble organic acids and the weaker inorganic acids can be employed for this purpose however. The use of the aqueous acid permits the conversion of the prepolymer into water solutions containing sufficient acetic or other organic acids to promote clear solutions containing any desired concentration of prepolymer limited only by the desired viscosity of the solution. These aqueous solutions can be applied to any surface upon which a resin coating is to be deposited and after heating, a strongly adherent resin coating is deposited permanently on the surface. Any substrate can be so coated whether fiber, film, sheet, piece or granule so long as said surface can stand a curing temperature of around 140° C. or above. These prepolymers are particularly suited for coating or laminating metals, glass, plastics, cellulose, veneers, etc.

The hardness, toughness and other physical properties of the final resin can be controlled to any desired specification by blending epoxidized oils and/or polyamine compounds. As a general rule such blended reaction products yield a finished resin having the specified properties.

Although the use of aqueous solutions of these prepolymers is least expensive for deposition of the prepolymer many other solvents are equally efficient to carry the prepolymer including alcohols, ketones, ethers, and aromatic hydrocarbons.

In the formation of a film of the prepolymer to develop a coating, a substrate such as metal or glass is coated by spraying, dipping, roller coating, etc., and the substrate and thin continuous film is heated to cure the supported film. The degree of heating required varies with the reactivity of the prepolymer (more reactive amines and higher oxirane fats cure faster to form a harder film) and also with the heat sensitivity of the material being coated. Generally the water must be removed from the surface by heat and forced air or vacuum and the film further heated to a temperature of about 100–200° C. Longer heating times are required at low temperatures while only a short heat treatment is needed at higher temperatures. The curing cycle for a given prepolymer is easily determinable by those skilled in the art.

The ideal time and temperature of cure for a given coating is best determined by trial and error. The tensile strength of the coating depends upon the degree of cure and the tensile strength for a given coating cured at a specific temperature rises with time of exposure and reaches a maximum just prior to degradation of the resin. As used in this specification and claims, the terms "cure" and "curing" have meanings well known in the art. Cure signifies the change in physical properties of the polymer by heat, chemical curing agents, etc., such that the prepolymer is changed from a fusible form to an infusible form and to a form wherein solubility of the polymer is materially decreased. Cure can be determined either by a heat-sealing test or by measuring the decrease in oxirane content of the composition resulting from cure. Ordinarily, a simple heat-sealing test wherein the coating is deposited on a surface such as bonderized steel panels and the panels exposed to heat for a short time and tack is tested, is sufficient. Oxirane content can be determined by a modification of the method published by A. J. Durbetaki in Analytical Chemistry, vol. 28, No. 12, December 1956, pp. 2,000–1. Percent oxirane is the ratio of weight of oxirane oxygen to total molecular weight of the composition times 100.

Obviously many modifications and variations of the invention as hereinbefore set forth may be made without departing from the spirit and scope thereof, and therefore only such limitations should be imposed as are indicated in the appended claims.

I claim:

1. A method for producing a prepolymer from an epoxidized vegetable oil which comprises: heating and reacting at a temperature of between about 25° C. and 100° C. a mixture of about 100 parts of said epoxidized oil having an oxirane oxygen content above about 8% and having nonterminal epoxy groups with about 20–50 parts by weight of an alkylene polyamine which has at least two amino nitrogens having at least one available hydrogen atom and is soluble in said epoxidized oil until the reaction mixture is soluble in a 1% aqueous acid solution, cooling said reaction mixture to avoid cross-linking of the product, and subsequently dissolving said reaction mixture in an aqueous acid solution.

2. The method of claim 1 wherein the epoxidized oil is epoxidized linseed oil.

3. The method of claim 1 wherein the epoxidized oil is epoxidized safflower oil.

4. The method of claim 1 wherein the epoxidized oil is epoxidized perilla oil.

5. The method of claim 1 wherein the polyamine is a polyalkylene polyamine.

6. The method of claim 1 wherein the polyamine is tetraethylene pentamine.

7. The method of claim 1 wherein the polyamine is triethylene tetramine.

8. The method of claim 1 wherein the polyamine is diethylene triamine.

9. A method for producing a prepolymer from a polyamino compound having at least two nontertiary amino groups and an epoxidized fatty acid ester of a lower alcohol which comprises: heating a mixture of 20–50 parts by weight of said polyamino compound and 100 parts by weight of an epoxidized fatty acid ester of a lower alcohol, said ester having an oxirane oxygen content above about 6% and having nonterminal epoxy groups, to a temperature of about 60–90° C., continuing said heating until the reaction mixture becomes soluble in a 1% equous solution of acid, cooling said reaction mixture to retard further polymerization of the components, and subsequently dissolving said reaction mixture in an aqueous acetic acid solution.

References Cited by the Examiner

UNITED STATES PATENTS

| | | | |
|---|---|---|---|
| 2,844,552 | 7/1958 | Glaser | 260—18 |
| 2,890,228 | 6/1959 | Forster | 260—18 |
| 2,899,397 | 8/1959 | Aelony et al. | 260—18 |
| 2,953,585 | 9/1960 | De Groote et al. | 260—18 |
| 2,993,920 | 7/1961 | Budde et al. | 260—18 |
| 3,035,000 | 5/1962 | Fulmer | 260—18 |

LEON J. BERCOVITZ, *Primary Examiner.*

R. W. GRIFFIN, *Assistant Examiner.*